(12) United States Patent
Dudar

(10) Patent No.: US 10,267,256 B1
(45) Date of Patent: Apr. 23, 2019

(54) METHOD AND SYSTEM FOR KNOCK CONTROL

(71) Applicant: Ford Global Technologies, LLC, Dearborn, MI (US)

(72) Inventor: Aed Dudar, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 15/899,718

(22) Filed: Feb. 20, 2018

(51) Int. Cl.
| | |
|---|---|
| F02D 41/24 | (2006.01) |
| F02D 41/00 | (2006.01) |
| F02D 13/06 | (2006.01) |
| F02D 41/06 | (2006.01) |
| F02D 41/14 | (2006.01) |
| F02D 41/22 | (2006.01) |
| F02P 5/152 | (2006.01) |

(52) U.S. Cl.
CPC ......... *F02D 41/2441* (2013.01); *F02D 13/06* (2013.01); *F02D 41/0087* (2013.01); *F02D 41/0097* (2013.01); *F02D 41/068* (2013.01); *F02D 41/1498* (2013.01); *F02D 41/222* (2013.01); *F02D 41/2474* (2013.01); *F02P 5/1522* (2013.01); *F02D 2200/101* (2013.01); *F02D 2200/1002* (2013.01); *F02D 2200/502* (2013.01); *F02D 2200/602* (2013.01)

(58) Field of Classification Search
CPC ...... F02D 41/24; F02D 41/2441; F02D 13/06; F02D 41/0087; F02D 41/0097; F02D 41/068; F02D 41/1498; F02D 41/222; F02D 41/2474; F02D 22/1002; F02D 2200/101; F02D 2200/502; F02D 2200/602; F02B 5/1522
See application file for complete search history.

(56) References Cited

U.S. PATENT DOCUMENTS

| | | | |
|---|---|---|---|
| 2014/0350823 A1 | 11/2014 | Glugla | |
| 2017/0175661 A1* | 6/2017 | Kumar | F02D 41/22 |
| 2018/0058367 A1* | 3/2018 | Ottikkutti | F02D 41/403 |

* cited by examiner

*Primary Examiner* — Hieu T Vo
(74) *Attorney, Agent, or Firm* — Julia Voutyras; McCoy Russell LLP

(57) ABSTRACT

Methods and systems are provided for monitoring knock in a variable displacement engine. During fuel-cut operation, an engine cylinder may be heated. Upon fuel reactivation, a crankshaft sensor profile may be relearned responsive to lack of knock in the heated cylinder. In this way, erroneous identification of a knocking cylinder due to inaccurate crankshaft position data may be determined and mitigated by re-learning the crankshaft sensor profile.

20 Claims, 7 Drawing Sheets

METHOD AND SYSTEM FOR KNOCK CONTROL

FIELD

The present description relates generally to methods and systems for detecting cylinder knock in a variable displacement engine.

BACKGROUND/SUMMARY

Engines may be configured to operate with a variable number of active or deactivated cylinders to increase fuel economy, while optionally maintaining the overall exhaust mixture air-fuel ratio about stoichiometry. Such engines are known as variable displacement engines (VDE). Therein, a portion of an engine's cylinders may be disabled during selected conditions defined by parameters such as an engine speed/load window, as well as various other operating conditions including operator torque demand. Conventional VDE control systems may disable a selected group of cylinders, such as a bank of cylinders, through the control of a plurality of cylinder valve deactivators that affect the operation of the cylinder's intake and exhaust valves, or through the control of a plurality of selectively deactivatable fuel injectors that affect cylinder fueling. Newer skip-fire or rolling VDE systems may be configured to activate/deactivate individual cylinders on an ongoing basis to provide a specific firing pattern based on a designated control algorithm.

During partial cylinder operation, the active cylinders operate at a higher load than they otherwise would for the overall torque level generated by the engine. During the higher load conditions, engine knock may be more prevalent. Engine knock, if left unabated, may lead to engine degradation. As one example, ignition timing may be retarded in the engine cylinders to abate knock. However, ignition timing retard may negatively impact fuel economy. Thus, methods to detect and mitigate knock in VDE systems are desirable, and in particular methods to accurately detect which cylinder is knocking.

One example approach for detecting and abating knock in a VDE system is described by Glugla in U.S. Patent Application Publication No. 2014/0350823. Therein, when knock is detected during partial cylinder operation, only the cylinder determined to be undergoing knock is subjected to ignition timing adjustment, as the crank angle between combustion events may be large enough to accurately identify the knocking cylinder. During full cylinder operation, when knock is detected, multiple cylinders may undergo ignition timing adjustment, thereby increasing the odds that knock occurring in the knocking cylinder will be abated during conditions where it may be difficult to detect which cylinder is knocking.

However, the inventors herein have recognized potential issues with such systems. As one example, identification of the knocking cylinder usually relies on engine position data output by a crankshaft position sensor. These crankshaft position sensors typically utilize a toothed wheel coupled to the crankshaft to measure engine position. However, over time the size and spacing of the teeth on the wheel may change, as well as the shape of the wheel itself. These changes may cause the crankshaft position sensor to output inaccurate engine position data, leading to inaccurate determinations of which cylinder is knocking. Thus, spark timing retard may be applied to the wrong cylinder, negatively impacting fuel economy without abating knock.

Accordingly, an approach is provided herein to at least partly address these issues. In one example, a method includes during fuel-cut operation, heating an engine cylinder and upon fuel reactivation, re-learning a crankshaft sensor profile responsive to lack of knock in the heated cylinder. In this way, a cylinder that is determined to be persistently knocking (e.g., knocking despite application of spark timing retard) may be induced to knock by heating the cylinder during a fuel-cut engine operating condition, such as deceleration fuel shut off. If the cylinder is induced to knock, the cylinder may be confirmed as persistently knocking due to soot build-up in the cylinder, for example. However, if the cylinder is not induced to knock upon being heated and reactivated, but a different cylinder of the engine is induced to knock upon being heated and reactivated (e.g., a cylinder adjacent in the engine firing order), the crankshaft position sensor may be implicated as having undergone a change in performance (e.g., a change in tooth spacing and/or size).

In one example, the cylinders may be induced to knock during the fuel-cut engine operation one by one by utilizing the selective cylinder deactivation mechanisms to hold the intake and exhaust valves of the cylinders closed during the fuel-cut operation. Continued rotation of the crankshaft causes the pistons to move up and down in their respective cylinders, leading to heating of the gasses trapped in the cylinders. The cylinders are then reactivated one at a time and output from the knock sensor is monitored to determine if any knocking occurs. In this way, knocking cylinders may be identified without relying on the crankshaft position sensor data. If the crankshaft position sensor is determined to be outputting inaccurate engine position data, the tooth profile of the crankshaft position sensor wheel may be relearned.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
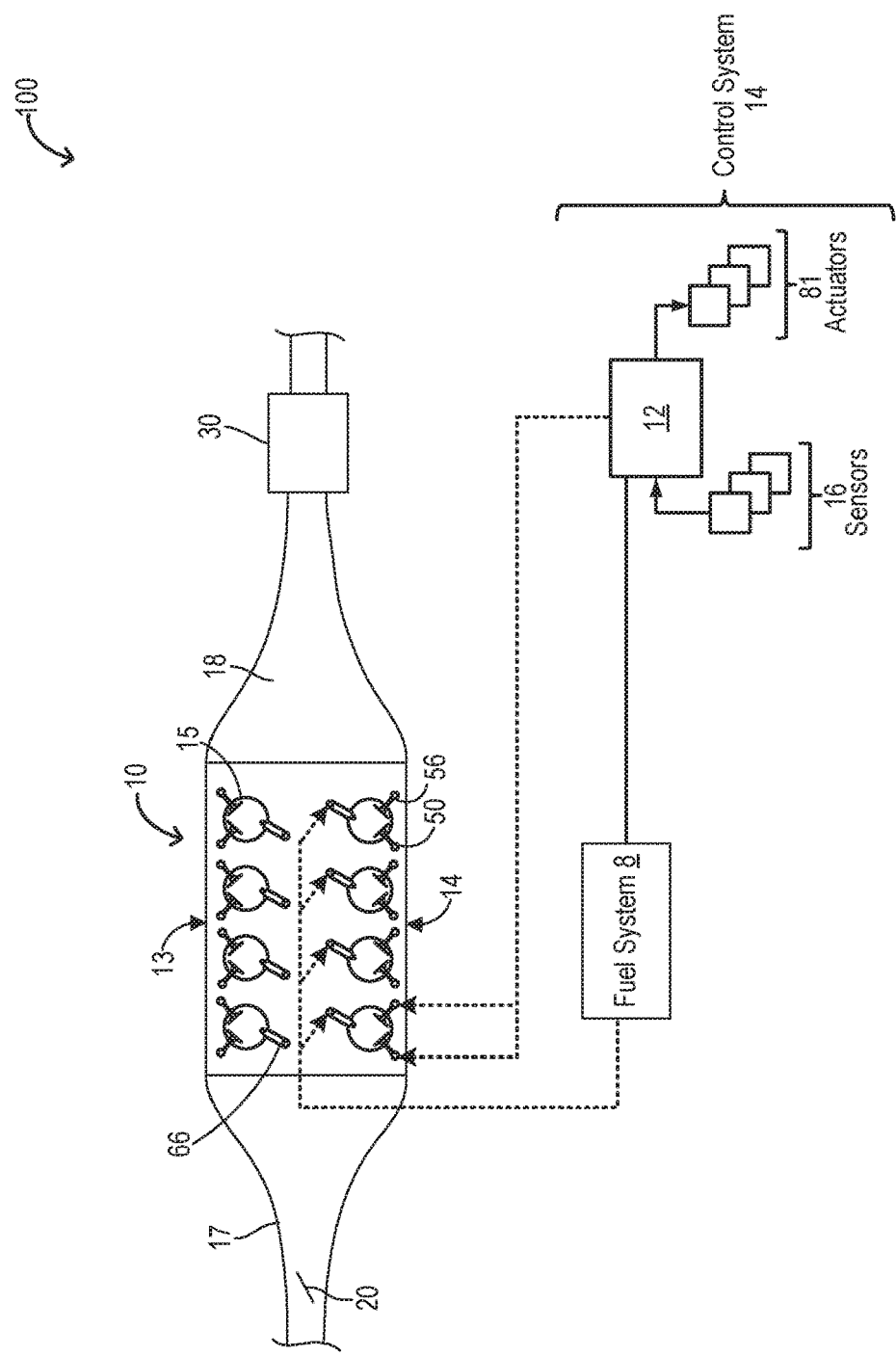
FIG. 1 shows an example embodiment of an engine system layout.
Figure 2:
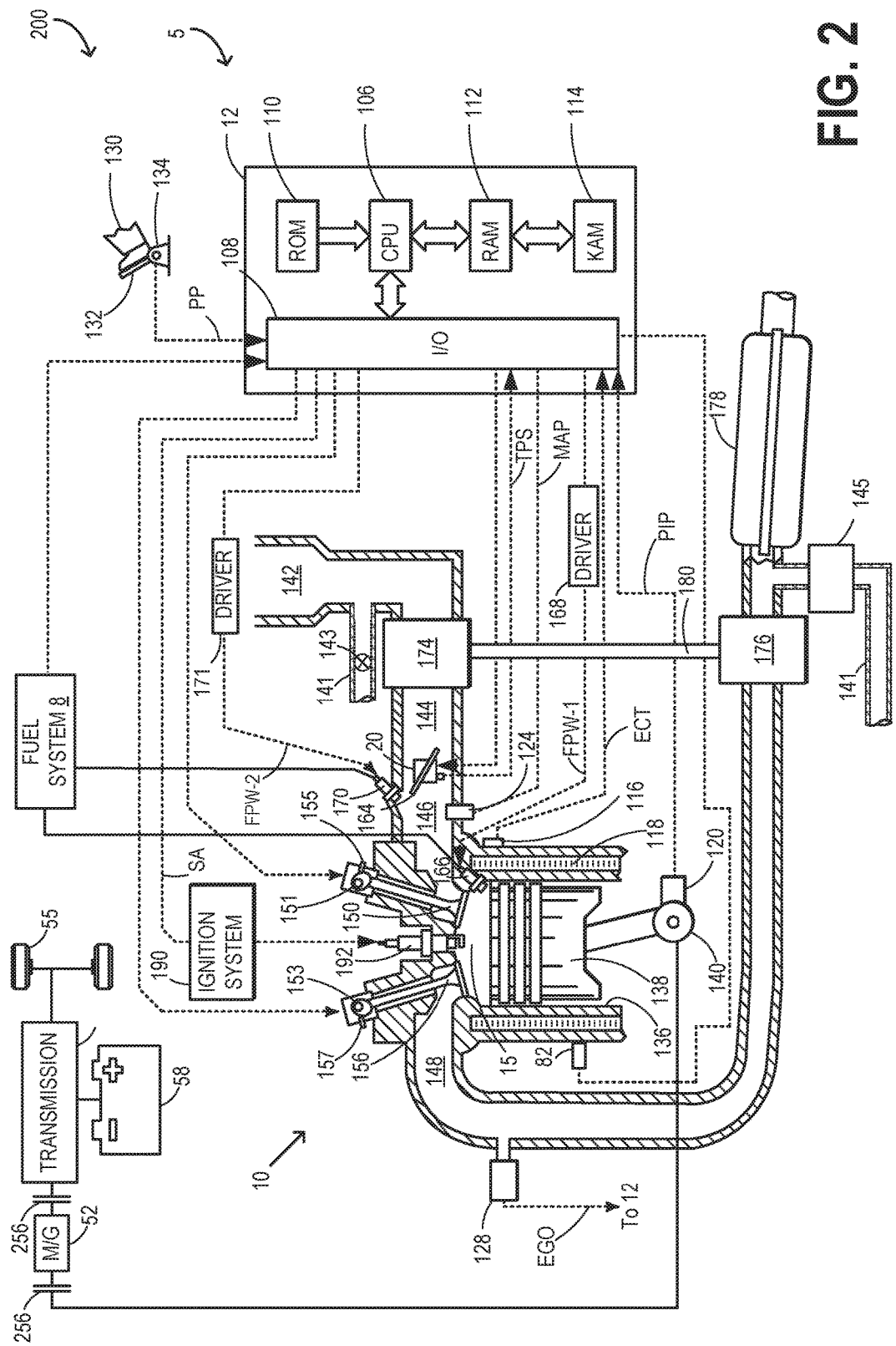
FIG. 2 shows a partial engine view.
Figure 3:
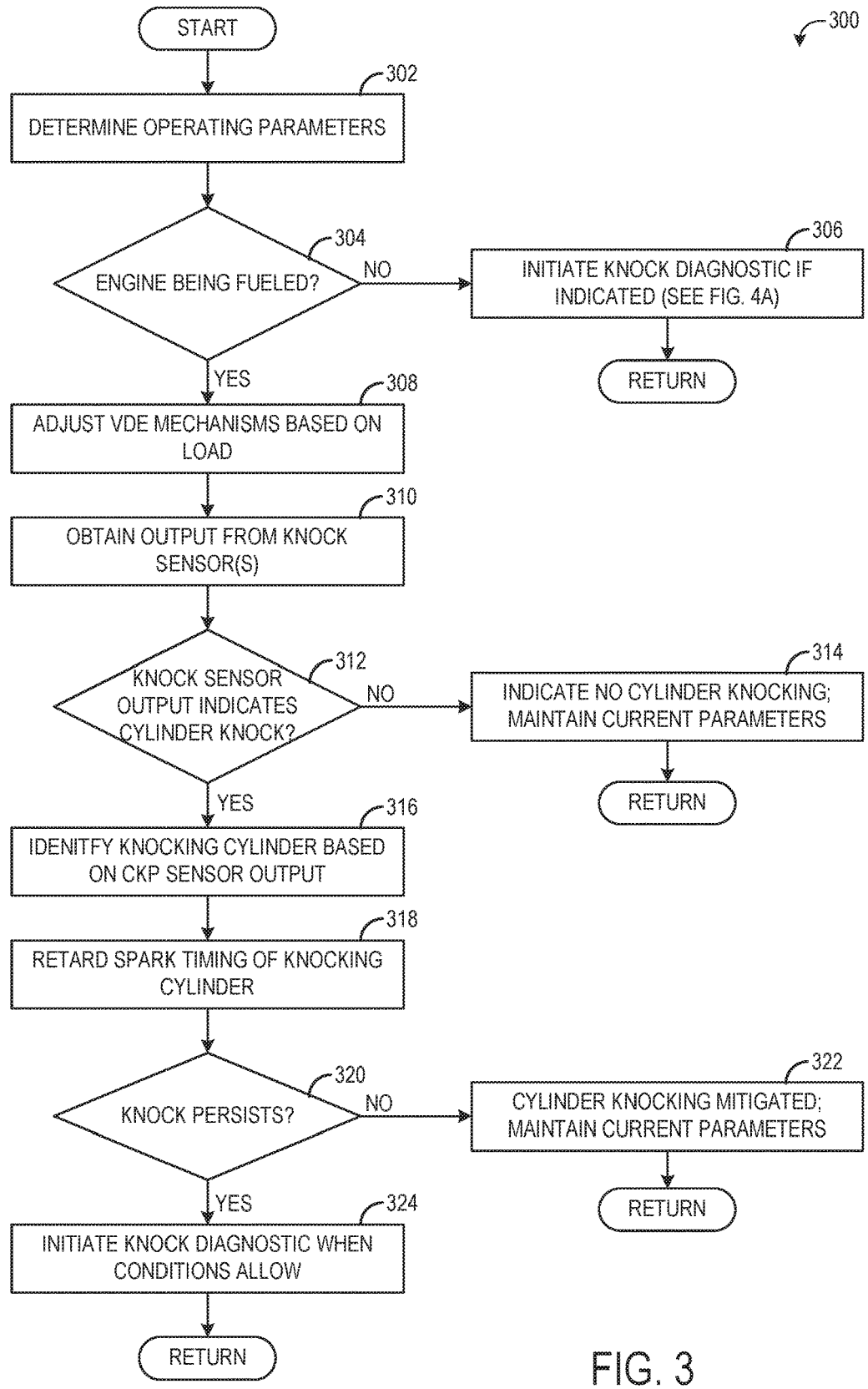
FIG. 3 is a flow chart illustrating a method for operating a VDE system.
Figure 4A:
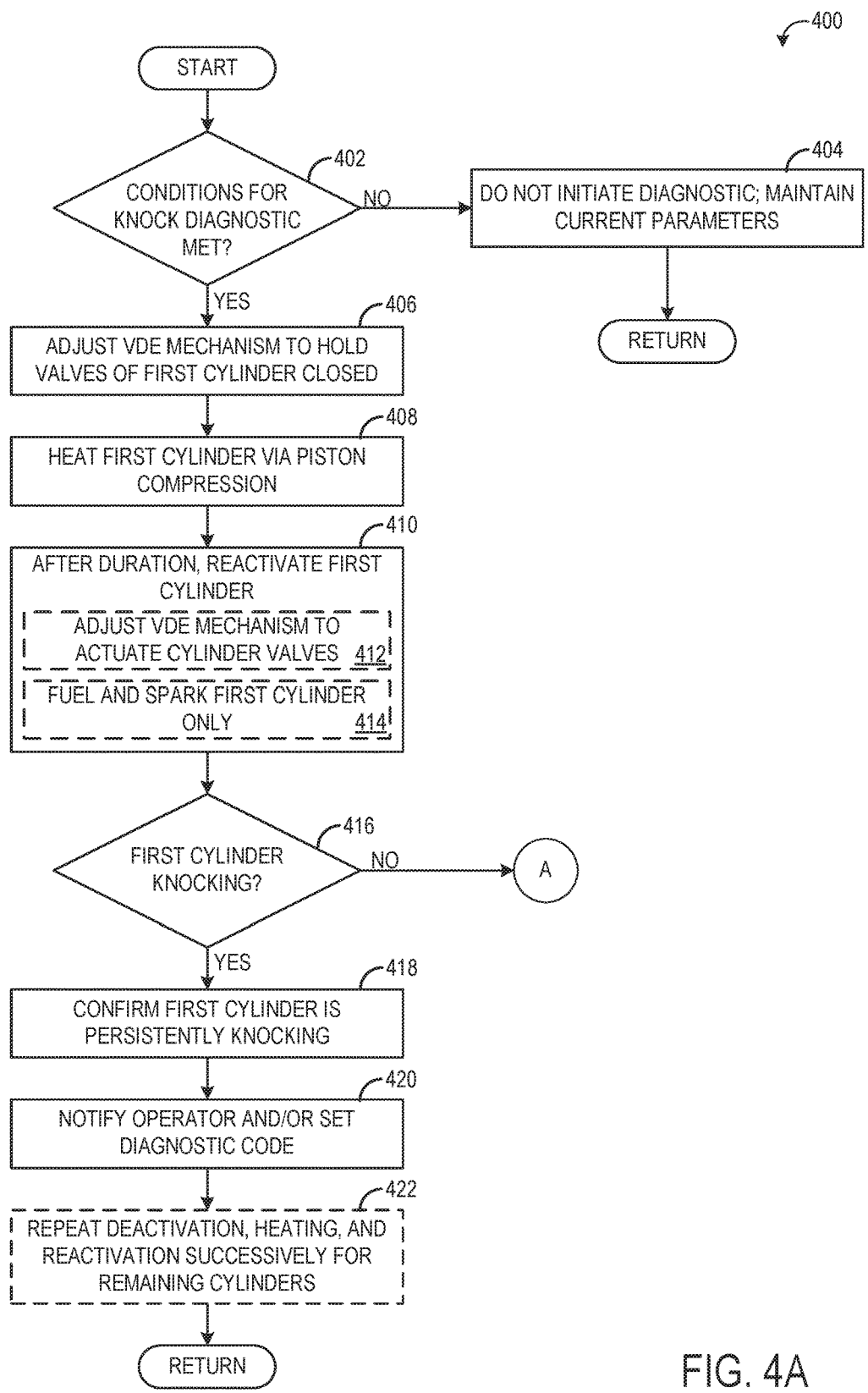
FIGS. 4A and 4B are flow charts illustrating a method for a knock diagnostic routine.
Figure 4B:
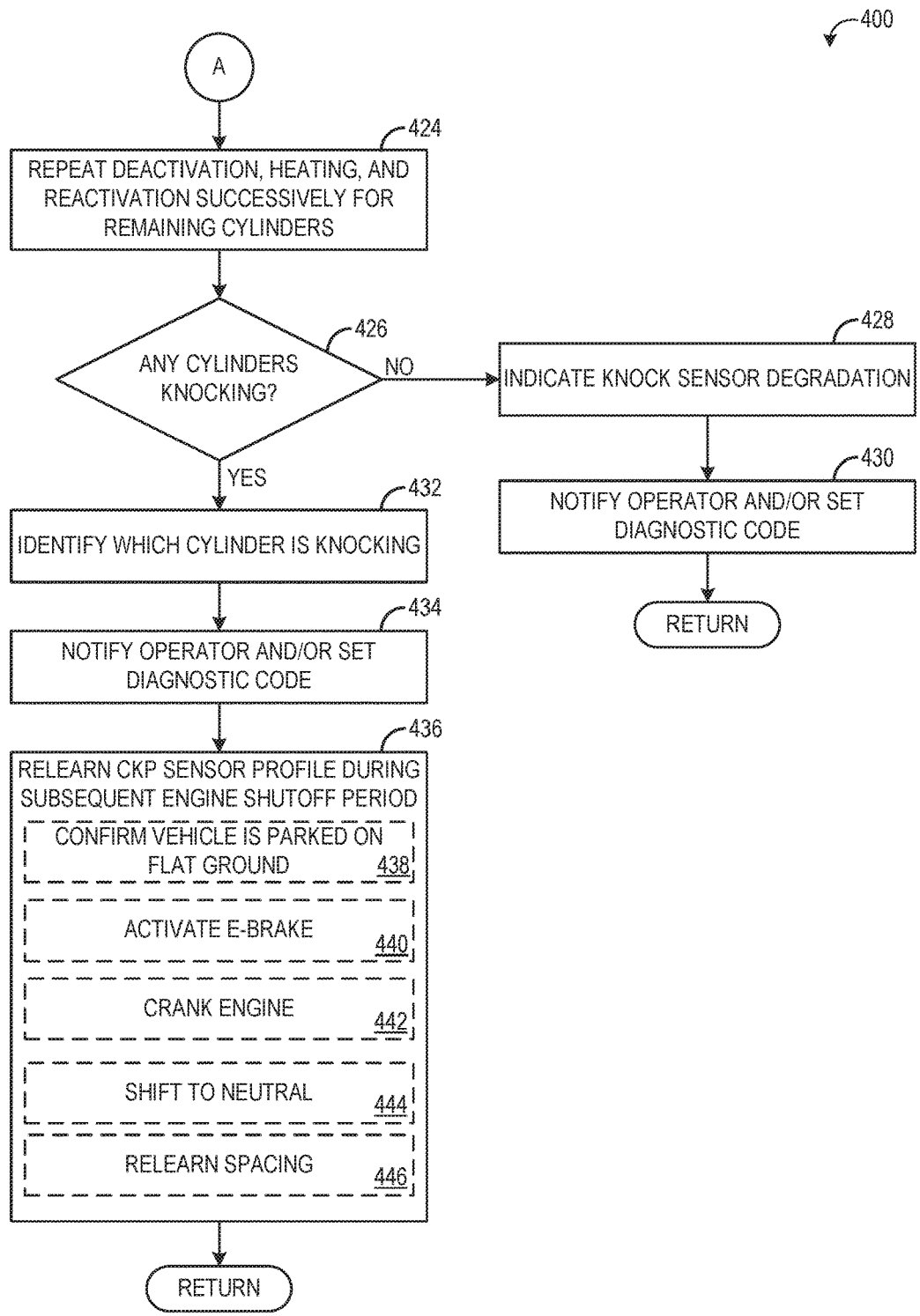

The following description relates to systems and methods for detecting cylinder knock in an engine configured for selected, individual cylinder deactivation (herein also referred to as rolling VDE), such as for the engine system of FIGS. 1-2. During fueled engine operation, VDE may be enabled during low torque engine conditions and knock may be detected using output from a knock sensor, as depicted by the method of FIG. 3 and the timeline of FIG. 5. If a cylinder is detected that persistently knocks (e.g., knocks despite application of spark retard), a knock diagnostic may be executed to determine if the correct cylinder was identified as the knocking cylinder, as shown by the method of FIGS. 4A-4B and the timeline of FIG. 6. If the knock diagnostic confirms that the correct cylinder was identified, an operator may be notified to clean the knocking cylinder to remove soot build up, for example. If the knock diagnostic confirms the correct cylinder was not identified, the crankshaft position sensor may be indicated as having undergone a change in performance, such as a change in wheel profile. In such examples, the wheel profile may be relearned during an engine and vehicle off period.

Turning now to FIG. 1, an example engine system 100 is shown. Engine system 100 includes an engine 10 having a first cylinder bank 13 and a second cylinder bank 14. In the depicted example, engine 10 is a V-8 engine with two cylinder banks, each having four cylinders 15. However in alternate examples, the engine may have an alternate configuration, such as an alternate number of cylinders (e.g., V-4, V-6, etc.), or an in-line arrangement of cylinders (e.g., I-3, I-4, etc.). Engine 10 has an intake manifold 17, with intake throttle 20, and an exhaust manifold 18 coupled to an emission control system 30. Emission control system 30 includes one or more catalysts and air-fuel ratio sensors, such as described with regard to FIG. 2. Engine 10 may operate on a plurality of substances, which may be delivered via fuel system 8. As one non-limiting example, engine 10 can be included as part of a propulsion system for a passenger vehicle.

Engine 10 may be a variable displacement engine (VDE), having one or more cylinders 15 with selectively deactivatable intake valves 50 and selectively deactivatable exhaust valves 56. Therein, selected cylinders may be deactivated by shutting off the respective cylinder valves, as elaborated below. In one example, intake valves 50 and exhaust valves 56 are configured for electric valve actuation (EVA) via electric individual cylinder valve actuators. While the depicted example shows each cylinder having a single intake valve and a single exhaust valve, in alternate examples, as elaborated at FIG. 2, each cylinder may have a plurality of selectively deactivatable intake valves and/or a plurality of selectively deactivatable exhaust valves.

In some examples, engine 10 may have additionally have selectively deactivatable (direct) fuel injectors 66 and the selected cylinders may be deactivated by shutting off the respective fuel injectors while maintaining operation of the intake and exhaust valves such that air may continue to be pumped through the cylinders.

During selected conditions, such as when the full torque capability of the engine is not needed, one or more cylinders of engine 10 may be selected for selective deactivation (herein also referred to as individual cylinder deactivation). This may include selectively deactivating one or more cylinders on the first cylinder bank 13, and/or selectively deactivating one or more cylinders on the second cylinder bank 14. The number and identity of cylinders deactivated on the cylinder bank may be symmetrical or asymmetrical. An engine controller 12 may continually analyze individual cylinders, determining whether to activate or deactivate each cylinder based on a driver's pedal position input and torque demands, providing what us known as a skip-fire or rolling VDE mode of operation. In still other examples, entire banks or subsets of cylinders may be deactivated.

During the deactivation, selected cylinders may be deactivated by closing individual cylinder valve mechanisms (e.g., VDE mechanisms), such as intake valve mechanisms, exhaust valve mechanisms, or a combination of both. Cylinder valves may be selectively deactivated via hydraulically actuated lifters (e.g., lifters coupled to valve pushrods), via a cam profile switching mechanism in which a cam lobe with no lift is used for deactivated valves, or via the electrically actuated cylinder valve mechanisms coupled to each cylinder. In addition, fuel flow to the deactivated cylinders may be stopped, such as by deactivating cylinder fuel injectors 66. In some examples, spark to the deactivated cylinders may also be stopped, such as by selectively controlling the vehicle ignition system to only deliver spark to active cylinders.

While the selected cylinders are disabled, the remaining enabled or active cylinders continue to carry out combustion with fuel injectors 66 and cylinder valve mechanisms active and operating. To meet the torque requirements, the engine produces the same amount of torque on the active cylinders. This requires higher manifold pressures, resulting in lowered pumping losses and increased engine efficiency. Also, the lower effective surface area (from only the enabled cylinders) exposed to combustion reduces engine heat losses, improving the thermal efficiency of the engine.

Cylinders may be deactivated to provide a specific firing (e.g., skip-firing or rolling VDE) pattern based on a designated control algorithm. More specifically, selected "skipped" cylinders are not fired while other "active" cylinders are fired. Optionally, a spark timing associated with a selected firing of a selected working chamber may also be adjusted based on a firing order or firing history of the selected working chamber. As used herein, the firing pattern or deactivation pattern may include a total number of deactivated cylinders to remaining active cylinders, as well as an identity of the deactivated and active cylinders. The firing pattern may further specify a total number of combustion events for which each deactivated cylinder is held deactivated, and/or a number of engine cycles over which the pattern is operated. The engine controller 12 may be configured with suitable logic, as described below, for determining a cylinder deactivation (or skip-firing) pattern based on engine operating conditions. For example, the controller may select a desired induction ratio to apply based on engine operating parameters, including operator torque demand, and then select a cylinder deactivation pattern that enables the desired induction ratio to be provided. As used herein, the induction ratio is defined as the number of actual cylinder induction events (e.g., cylinders firing) that occur divided by the number of cylinder induction event opportunities (e.g., total engine cylinders).

Engine controller 12 may include a drive pulse generator and a sequencer for determining a cylinder pattern that provides the desired induction ratio based on the desired engine output at the current engine operating conditions. For example, the drive pulse generator may use adaptive predictive control to dynamically calculate a drive pulse signal that indicates which cylinders are to be fired and at what intervals to obtain the desired output (that is, the cylinder firing/skip-firing pattern). The cylinder firing pattern may be adjusted to provide the desired output without generating excessive or inappropriate vibration within the engine. As such, the cylinder pattern may be selected based on the configuration of the engine, such as based on whether the engine is a V-engine, an in-line engine, the number of engine cylinders present in the engine, etc. Based on the selected cylinder patter, the individual cylinder valve mechanisms of the selected cylinders may be closed while fuel flow and spark to the cylinders are stopped, thereby enabling the desired induction ratio to be provided.

Since optimal efficiency for a given cylinder is near full output, a lower frequency of firing events may be chosen to reduce output. For example, skipping every other cylinder would produce half of the power, on average. In addition, a spacing between the firing events may be adjusted to minimize NVH. Whether all of the cylinders are included in the skip-firing pattern may depend on the fraction of the full engine output desired, the full engine torque output itself depending upon various conditions, such as cam timing, cylinder temperature, etc.

In this way, by adjusting the cylinder pattern of individual cylinder valve mechanisms and individual cylinder fuel injectors, a desired engine output can be provided by operating fewer cylinders more efficiently, thereby improving fuel economy.

Engine 10 may be controlled at least partially by a control system including controller 12. Controller 12 may receive various signals from sensors 16 coupled to engine 10 (and described with reference to FIG. 2), and send control signals to various actuators 81 coupled to the engine and/or vehicle (as described with reference to FIG. 2). The various sensors may include, for example, various temperature, pressure, and air-fuel ratio sensors. In addition, controller 12 may receive an indication of throttle position from a throttle position sensor.

Turning now to FIG. 2, an example embodiment 200 of a combustion chamber or cylinder of internal combustion engine 10 (such as engine 10 of FIG. 1) is shown. Components previously introduced in FIG. 1 may be similarly numbered. Engine 10 may be coupled to a propulsion system, such as vehicle 5 configured for on-road travel. Engine 10 may receive control parameters from a control system including controller 12 (such as controller 12 of FIG. 1) and input from a vehicle operator 130 via an input device 132. In this example, input device 132 includes an accelerator pedal and a pedal position sensor 134 for generating a proportional pedal position signal PP. Cylinder (herein also "combustion chamber") 15 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system (not shown).

Cylinder 15 can receive intake air via a series of intake air passages 142, 144, and 146. Intake air passage 146 may communicate with other cylinders of engine 10 in addition to cylinder 15. In some embodiments, one or more of the intake passages may include a boosting device such as a turbocharger or a supercharger. For example, FIG. 2 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 20 including a throttle plate 164 may be provided along an intake passage of the engine for varying the flow rate and/or pressure of intake air provided to the engine cylinders. For example, throttle 20 may be disposed downstream of compressor 174 or alternatively may be provided upstream of compressor 174.

Exhaust passage 148 may receive exhaust gases from other cylinders of engine 10 in addition to cylinder 15. Exhaust gas sensor 128 is shown coupled to exhaust passage 148 upstream of emission control device 178, which is part of emission control system 30, as shown in FIG. 1. Exhaust gas sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Each cylinder of engine 10 may include one or more intake valves and one or more exhaust valves. For example, cylinder 15 is shown including at least one poppet-style intake valve 150 and at least one poppet-style exhaust valve 156 located at an upper region of cylinder 15. In some embodiments, each cylinder of engine 10, including cylinder 15, may include at least two intake poppet valves and at least two exhaust poppet valves located at an upper region of the cylinder.

Intake valve 150 may be controlled by controller 12 by cam actuation via cam actuation system 151. Similarly, exhaust valve 156 may be controlled by controller 12 via cam actuation system 153. Cam actuation systems 151 and 153 may each include one or more cams and may utilize one or more of cam profile switching (CPS), variable cam timing (VCT), variable valve timing (VVT), and/or variable valve lift (VVL) systems that may be operated by controller 12 to vary valve operation. The operation of intake valve 150 and exhaust valve 156 may be determined by valve position sensors (not shown) and/or camshaft position sensors 155 and 157, respectively. In alternative embodiments, the intake and/or exhaust valve may be controlled by electric valve actuation. For example, cylinder 15 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system.

As elaborated with reference to FIG. 1, engine 10 may be a variable displacement engine wherein the intake and exhaust valves are selectively deactivatable responsive to operator torque demand to operate the engine at a desired induction ratio, with a selected cylinder deactivation (or firing) pattern.

In some embodiments, each cylinder of engine 10 may include a spark plug 192 for initiating combustion. Ignition system 190 can provide an ignition spark to cylinder 15 via spark plug 192 in response to spark advance signal SA from controller 12, under select operating modes. In other embodiments, such as where cylinder combustion is initiated using compression ignition, the cylinder may not include a spark plug.

In some embodiments, each cylinder of engine 10 may be configured with one or more injectors for delivering fuel to the cylinder. As a non-limiting example, cylinder 15 is shown including two fuel injectors 166 and 170. Fuel injectors 166 and 170 may be configured to deliver fuel received from fuel system 8 via a high pressure fuel pump, and a fuel rail. Alternatively, fuel may be delivered by a single stage fuel pump at lower pressure, in which case the timing of the direct fuel injection may be more limited during the compression stroke than if a high pressure fuel system is used. Further, the fuel tank may have a pressure transducer providing a signal to controller 12.

Fuel injector 166 is shown coupled directly to cylinder 15 for injecting fuel directly therein in proportion to the pulse width of signal FPW-1 received from controller 12 via electronic driver 168. In this manner, fuel injector 166 provides what is known as direct injection (hereafter referred to as "DI") of fuel into combustion cylinder 15. While FIG. 1 shows injector 166 positioned to one side of cylinder 15, it may alternatively be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing.

As elaborated with reference to FIG. 1, engine 10 may be a variable displacement engine wherein fuel injector 166 is selectively deactivatable responsive to operator torque demand to operate the engine at a desired induction ratio, with a selected cylinder deactivation (or firing) pattern.

Fuel injector 170 is shown arranged in intake passage 146, rather than in cylinder 15, in a configuration that provides what is known as port injection of fuel (hereafter referred to as "PFI") into the intake port upstream of cylinder 15. Fuel injector 170 may inject fuel, received from fuel system 8, in proportion to the pulse width of signal FPW-2 received from controller 12 via electronic driver 171. Note that a single electronic driver 168 or 171 may be used for both fuel injection systems, or multiple drivers, for example electronic driver 168 for fuel injector 166 and electronic driver 171 for fuel injector 170, may be used, as depicted.

Fuel may be delivered by both injectors to the cylinder during a single cycle of the cylinder. For example, each injector may deliver a portion of a total fuel injection that is combusted in cylinder 15. As such, even for a single combustion event, injected fuel may be injected at different timings from the port and direct injector. Furthermore, for a single combustion event, multiple injections of the delivered fuel may be performed per cycle. The multiple injections may be performed during the compression stroke, intake stroke, or any appropriate combination thereof.

As described above, FIG. 2 shows only one cylinder of a multi-cylinder engine. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 2 with reference to cylinder 15.

The engine may further include one or more exhaust gas recirculation passages for recirculating a portion of exhaust gas from the engine exhaust to the engine intake. As such, by recirculating some exhaust gas, an engine dilution may be affected which may improve engine performance by reducing engine knock, peak cylinder combustion temperatures and pressures, throttling losses, and NOx emissions. In the depicted embodiment, exhaust gas may be recirculated from exhaust passage 148 to intake passage 144 via EGR passage 141. The amount of EGR provided to intake passage 144 may be varied by controller 12 via EGR valve 143. Further, an EGR sensor 145 may be arranged within the EGR passage and may provide an indication of one or more of pressure, temperature, and concentration of the exhaust gas.

In some examples, vehicle 5 may be a hybrid vehicle with multiple sources of torque available to one or more vehicle wheels 55. In other examples, vehicle 5 is a conventional vehicle with only an engine, or an electric vehicle with only electric machine(s). In the example shown, vehicle 5 includes engine 10 and an electric machine 52. Electric machine 52 may be a motor or a motor/generator. Crankshaft 140 of engine 10 and electric machine 52 are connected via a transmission 54 to vehicle wheels 55 when one or more clutches 256 are engaged. In the depicted example, a first clutch 256 is provided between crankshaft 140 and electric machine 52, and a second clutch 256 is provided between electric machine 52 and transmission 54. Controller 12 may send a signal to an actuator of each clutch 256 to engage or disengage the clutch, so as to connect or disconnect crankshaft 140 from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 52 receives electrical power from a traction battery 58 to provide torque to vehicle wheels 55. Electric machine 52 may also be operated as a generator to provide electrical power to charge battery 58, for example during a braking operation.

Controller 12 is shown as a microcomputer, including microprocessor unit 106, input/output ports 108, an electronic storage medium for executable programs and calibration values shown as read-only memory chip 110 in this particular example, random access memory 112, keep alive memory 114, and a data bus. Controller 12 may receive various signals from sensors coupled to engine 10, in addition to those signals previously discussed, including measurement of engine coolant temperature (ECT) from temperature sensor 116 coupled to cooling sleeve 118; a profile ignition pickup signal (PIP) from Hall effect sensor 120 (or other type) coupled to crankshaft 140; throttle position (TPS) from a throttle position sensor; and manifold absolute pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold. Still other sensors may include fuel level sensors and fuel composition sensors coupled to the fuel tank(s) of the fuel system. Controller 12 may receive an indication of cylinder knock from one or more knock sensors 82 distributed along the engine block. When included, the plurality of knock sensors may be distributed symmetrically or asymmetrically along the engine block. As such, the one or more knock sensors 82 may be accelerometers, ionization, or cylinder pressure sensors.

Storage medium read-only memory chip 110 can be programmed with computer readable data representing instructions executable by microprocessor unit 106 for performing the methods described below as well as other variants that are anticipated but not specifically listed.

The controller 12 receives signals from the various sensors of FIGS. 1-2 and employs the various actuators of FIGS. 1-2 to adjust engine operation based on the received signals and instructions stored on a memory of the controller.

Turning now to FIG. 3, an example method 300 is shown for identifying knock in a VDE engine. Instructions for carrying out method 300 and the rest of the methods included herein may be executed by a controller based on instructions stored on a memory of the controller and in conjunction with signals received from sensors of the engine system, such as the sensors described above with reference to FIGS. 1-2. The controller may employ engine actuators of the engine system to adjust engine operation, according to the methods described below.

At 302, the routine includes estimating and/or measuring engine operating conditions including engine speed, operator torque demand, throttle position, accelerator pedal position (PP), manifold absolute pressure (MAP), mass air flow (MAF), and other parameters. At 304, method 300 includes determining if the engine is currently being fueled. Engine fueling status may be determined based on commanded fuel injection amounts, vehicle status (e.g., if the vehicle is commanded on or off), and/or operating conditions such as operator-requested torque and vehicle speed, for example. The engine may be unfueled during vehicle-off conditions or when the vehicle is being propelled via motor torque (in hybrid vehicles). The engine may also be unfueled during certain vehicle-on conditions, such as when the vehicle is coasting down a hill (and hence the vehicle is propelled with its own momentum). During no load vehicle operation (e.g., where the operator is not requesting torque but the vehicle is on and in gear), fuel injection to all cylinders may be disabled. This unfueled operation of the engine, where the vehicle is still on, may be referred to as deceleration fuel shut-off (DFSO).

If the engine is not being fueled, method 300 proceeds to 306 to initiate a knock diagnostic routine, if indicated by operating conditions. The knock diagnostic routine may execute during DFSO in order to confirm the identity of any cylinders that have undergone knock during fueled engine operation, and will be explained in more detail below with respect to FIG. 4A. If the engine is being fueled (e.g., at least one cylinder of the engine is receiving fuel), method 300 proceeds to 308 to adjust VDE mechanisms based on operator-requested torque or engine load. As explained above with respect to FIG. 1, one or more cylinders of the engine may be selectively deactivated during low torque/load conditions. As used herein, a cylinder activation event refers to a cylinder firing with intake and exhaust valves opening and closing during a cycle of the cylinder while a cylinder deactivation event refers to a cylinder not firing with intake and exhaust valves held closed during a cycle of the cylinder. The selective cylinder deactivation includes, for the selected cylinders to be deactivated, holding the cylinder valves closed, with no fuel injected into the cylinders, for an entire engine cycle of 720 crank angle degrees (that is, for all 4 strokes of a cylinder).

In one example, cylinder deactivation may include closing the selected individual cylinder valve mechanisms (e.g., VDE mechanisms), such as intake valve mechanisms, exhaust valve mechanisms, or a combination of both by sending a valve closing command from the controller to valve actuators. Cylinder valves may be selectively deactivated via hydraulically actuated lifters (e.g., lifters coupled to valve pushrods), via a cam profile switching mechanism in which a cam lobe with no lift is used for deactivated valves, or via the electrically actuated cylinder valve mechanisms coupled to each cylinder. In addition, fuel flow and spark to the deactivated cylinders may be stopped, such as by deactivating cylinder fuel injectors and disabling a spark signal commanded to a given cylinder's spark plug.

The remaining, non-deactivated cylinders may continue to receive fuel and the intake and exhaust valves of those cylinders may be actuated so that combustion occurs in those cylinders according to the engine firing order. A suitable number of cylinders may be deactivated based on torque, such as no cylinders (when requested torque is greater than a threshold), one cylinder, two cylinders, an entire bank of cylinders, etc.

At 310, method 300 includes obtaining output from one or more knock sensors, such as knock sensor 82. Depending on the engine configuration, one knock sensor may be present, or more than one knock sensor may be present. For example, in engines with two cylinder banks, one knock sensor may be present on each cylinder bank. The output from the knock sensor(s) may include a voltage induced by engine vibrations.

At 312, method 300 includes determining if the knock sensor output indicates cylinder knock is occurring. For example, if the output (e.g., voltage) from the knock sensor (s) is greater than a knock threshold, it may be indicative of cylinder knock. Cylinder knock includes the detonation of air/fuel mixture outside the flame front initiated by spark ignition, and may result in higher than desired cylinder pressure. The detonation may be detected by the increased engine vibration as measured by the knock sensor(s).

If the output from the knock sensor(s) does not indicate cylinder knock, for example if the output from the knock sensor(s) is below a knock threshold, method 300 proceeds to 314 to indicate that no cylinders are knocking. The current operating parameters (such as spark timing, throttle position, engine dilution) may be maintained. Method 300 then returns.

If the knock sensor output does indicate that cylinder knock is occurring, for example, if the output from the knock sensor(s) is greater than the knock threshold, method 300 proceeds to 316 to identify which cylinder is knocking based on output from the crankshaft position sensor (CKP sensor). The CKP sensor may include a Hall effect sensor, such as sensor 120 of FIG. 2, or other sensor that outputs a signal (e.g., square wave) with peaks corresponding to teeth coupled to a wheel (which is turn coupled to or otherwise rotates with the crankshaft) passing by the sensor. The wheel may be missing one or more teeth to provide a reference signal that may be tied to engine position. For example, a reluctor wheel having 35 teeth with a missing tooth in the position where the 36$^{th}$ tooth would be positioned (referred to as a 36-1 wheel) may be coupled to the crankshaft. When the missing tooth passes by the sensor, the lack of a resultant peak is detected by the controller and the controller identifies that the engine is in a given position (e.g., cylinder 1 is at TDC). (As the wheel will produce a missing peak twice every engine cycle, a signal from a camshaft sensor may be used to inform the controller of which rotation of the engine cycle, either the first or second, the crankshaft is currently in.) As each tooth passes by the sensor, the resultant peak is generated and the signal is sampled/saved by the controller, allowing engine crank angle to be determined.

The controller may time-stamp the signal from the knock sensor and compare the knock sensor signal to the crankshaft position sensor signal to identify which cylinder is knocking. For example, a time window during which the knock sensor output is greater than the knock threshold may be determined, and then based on the crankshaft position sensor output (e.g., over the same time window), the controller may determine that the engine was at a given crank angle when the knock occurred. Based on the known crank angle, the cylinder undergoing combustion may be identified (e.g., the controller may know that the first cylinder of the engine is in its power stroke at the given crank angle). Other ways of identifying the knocking cylinder are possible, such as by crank-angle stamping the knock sensor signal.

At 318, method 300 includes retarding spark timing of the identified knocking cylinder. Once knock is identified and the cylinder undergoing knocking is confirmed from the crankshaft position sensor output, the spark timing for the knocking cylinder may be adjusted (e.g., retarded) to mitigate the knocking. However, other mechanisms for abating knocking are possible, such as adjusting engine dilution (e.g., by adjusting EGR, throttle position, and/or fuel injection amounts), injecting water to the knocking cylinder, etc.

At 320, method 300 determines if the knock is persisting even after knock abatement. For example, upon retarding spark timing, the output from the knock sensor may continue to be monitored. If the knock sensor output is still above the knock threshold and the output from the crankshaft position sensor indicates the previously identified cylinder is still the knocking cylinder, it may be determined that the knocking is persistent. If the knocking does not persist, for example if the spark retard was successful in mitigating the knocking, method 300 proceeds to 322 to indicate that the cylinder knocking has been mitigated. The method may also include maintaining current operating parameters, including maintaining the spark retard to the knocking cylinder, at least for a duration (e.g., until torque decreases). Method 300 then returns.

If the knock persists, for example if the output from the knock sensor is still above the knock threshold even after spark timing of the knocking cylinder has been retarded for a number of engine cycles, method 300 proceeds to 324 to initiate a knock diagnostic when conditions allow. The persistently knocking cylinder may be a result of soot/carbon build-up in the knocking cylinder, making the cylinder prone to knocking. During service, the deposits may be cleaned out of the cylinder to prevent future knocking. However, the persistent knocking may instead be due to misidentification of the knocking cylinder resulting from irregularities in or changes to the crankshaft position sensor. When the vehicle is manufactured, the crankshaft position sensor profile may be learned, so that effects of crank wheel teeth irregularities, flex plate distortions, inherent engine imbalance, and sensor error may be learned and accounted for. However, over time the teeth of the wheel may wear down, causing the teeth to have different spacing than when the wheel was first installed. Such changes may result in the controller misidentifying the crank angle window during which the knocking occurred.

Thus, to differentiate between a knocking cylinder due to carbon deposits (or other feature of the cylinder) and a crankshaft position sensor that has undergone a change in performance since a previous learning of the wheel profile, the knock diagnostic routine may be performed. The knock diagnostic routine is explained below with respect to FIGS. 4A and 4B, and includes inducing knock during otherwise unfueled engine conditions. Thus, the diagnostic being performed when conditions allow may include the diagnostic being performed during DFSO or other fuel-cut engine operating condition, as explained below.

FIGS. 4A and 4B illustrate a method 400 for performing a knock diagnostic routine. Method 400 may be performed as part of method 300, for example in response to identification of a persistently knocking cylinder (e.g., at 324 of method 300). In other examples, the knock diagnostic may be performed at other times, independent of method 300 (e.g., even if a persistently knocking cylinder is not identified). At 402, method 400 includes determining if the conditions for executing the knock diagnostic are met. The conditions may include an unfueled engine operation, such as DFSO, where fuel injection to all the cylinders is disabled but the crankshaft is still rotating. The conditions may also include an identification of a persistently-knocking cylinder during a prior fueled engine operation. The conditions may alternatively or additionally include a threshold duration (of miles driven or time) having elapsed since a previous knock diagnostic or previous crankshaft position sensor profile learning routine was carried out. In examples, the knock diagnostic routine may only be carried out when the DFSO event is predicted to last at least at threshold duration (e.g., long enough to deactivate and reactivate each cylinder of the engine). The predicted duration of the DFSO event may be based on GPS or other location information, for example.

If the conditions for carrying out the knock diagnostic are not met, method 400 proceeds to 404 and does not initiate the knock diagnostic. The method may also include maintaining the current operating parameters. Method 400 then returns. If the conditions for carrying out the knock diagnostic are met, method 400 proceeds to 406 to adjust a selective cylinder deactivation mechanism (also referred to as the VDE mechanism) to hold the intake valve(s) and exhaust valve(s) of a first cylinder of the engine closed. The first cylinder may be the cylinder identified as the persistently-knocking cylinder during a prior fueled engine operation. In other examples, the first cylinder may be randomly selected or predefined cylinder. As explained above with respect to FIG. 3, adjusting the VDE mechanism to disable actuation of the intake and exhaust valves may include adjusting hydraulically actuated lifters (e.g., lifters coupled to valve pushrods), adjusting a cam profile switching mechanism in which a cam lobe with no lift is used for deactivated valves, or adjusting the electrically actuated cylinder valve mechanisms coupled to each cylinder.

At 408, method 400 includes heating the first cylinder via piston compression. With the cylinder valves (e.g., the intake and exhaust valves) held closed, any gas in the first cylinder will be trapped upon closing of the cylinder valves. Because the engine still rotates during DFSO, the piston of the first cylinder continues to move up and down. As the trapped gas in the first cylinder is compressed by the piston, the gas heats up, thus heating the first cylinder. While the first cylinder is heated via piston compression, the cylinder valves are held closed, fuel injection is disabled, and no spark occurs in the first cylinder. At 410, method 400 includes reactivating the first cylinder after a duration. The duration may be a predefined duration of time (e.g., one second), a predefined number of crankshaft rotations, or the duration may be dynamically determined (e.g., based on the temperature of the cylinder). Reactivating the first cylinder includes, as indicated at 412, adjusting the VDE mechanism to actuate the cylinder valves. The intake valve(s) of the first cylinder is thus opened during the intake stroke and the exhaust valve(s) of the first cylinder is opened during the exhaust stroke of the first cylinder. Reactivating the first cylinder further includes, as indicated at 414, supplying fuel and spark to the first cylinder only. Fuel is injected to the first cylinder during a suitable part of the cylinder cycle (e.g., during the compression stroke) and the first cylinder is sparked at a suitable timing (e.g., at the minimum timing for best torque). As a result, combustion is expected to occur in the first cylinder, while other cylinders remain disabled (although the cylinder valves of the remaining cylinders may also be actuated).

At 416, method 400 includes determining if the first cylinder exhibits knocking upon reactivation. The knock determination is made based on output from the knock sensor, e.g., in response to the output of the knock sensor being above the knock threshold. If knock is not detected upon the first cylinder being reactivated, method 400 proceeds to 424 of FIG. 4B, which will be explained in more detail below. If knock is detected upon the first cylinder being reactivated, method 400 proceeds to 418 to confirm that the first cylinder is persistently knocking. At 420, method 400 includes notifying an operator and/or setting a diagnostic code. For example, if the first cylinder was previously identified (e.g., during a prior fueled engine operation) to be a persistently-knocking cylinder, and the knock diagnostic confirms that the first cylinder is the persistently-knocking cylinder, a diagnostic code may be set identifying that the first cylinder is prone to knocking. During a future service event, the first cylinder may be cleaned to remove soot deposits that may cause the knocking. Further, engine operating parameters for future engine operations may be adjusted to prevent or reduce knocking, such as limiting torque, increasing water injection to the first cylinder, increasing engine dilution, and so forth.

At 422, method 400 optionally includes repeating the deactivation, heating, and reactivation successively for remaining cylinders. Even if the first cylinder is confirmed as being a persistently-knocking cylinder, it may be desirable to heat and then reactivate each remaining cylinder in order to observe if any of the remaining cylinders are prone to knocking. If one or more remaining cylinders exhibit knocking upon reactivation, respective diagnostic codes for those cylinders may set also, in order to expedite cleaning of those cylinders during a future service event. In some examples, if knocking is observed in most or all of the cylinders, the knock sensor may be determined to be degraded. Method 400 then returns.

Referring now to FIG. 4B, upon determining that no knocking occurs in the first cylinder, method 400 proceeds to 424 to repeat the deactivation, heating, and reactivation successively for remaining cylinders. For example, intake and exhaust valves of a second cylinder are held closed, and movement of the piston of the second cylinder compresses gas trapped in the second cylinder in order to heat the second cylinder. Once the second cylinder is heated, the intake and exhaust valves of the second cylinder are actuated, fuel is supplied to the second cylinder, and spark is activated in the second cylinder. Output from the knock sensor is then analyzed for one or more engine cycles while the second cylinder is activated (e.g., combusting) to determine if the second cylinder knocks. This process is repeated for the next cylinder, and so forth, until all the cylinders of the engine have been deactivated, heated, and reactivated. Each time a cylinder is reactivated, that cylinder is the only cylinder of the engine undergoing combustion.

At 426, method 400 includes determining if knock was detected in any of the cylinders. If knock was not detected in any of the cylinders, method 400 proceeds to 428 to indicate potential knock sensor degradation. Because knock may have been detected during a prior fueled engine operation, but yet no knock was detected during the knock diagnostic, the knock sensor may be irrational or working unreliably. Thus, at 430, method 400 includes notifying an operator and/or setting a diagnostic code indicating a possible degradation of the knock sensor. Method 400 then returns.

If knock is detected in at least one cylinder, method 400 proceeds to 432 to identify which cylinder is knocking. Unlike the identification of the knocking cylinder performed in method 300, the knock diagnostic does not rely on crankshaft position sensor output to identify the knocking cylinder but instead identifies the knocking cylinder based on which cylinder received fuel and spark prior to detecting the knock with the knock sensor. At 434, method 400 may notify an operator of the knocking cylinder and/or set a diagnostic code indicating which cylinder is knocking.

At 436, method 400 includes relearning the crankshaft position sensor profile during a subsequent engine shutoff period. As explained above, the crankshaft position sensor includes a plurality of teeth evenly spaced on a wheel, with one or more teeth missing to provide a reference. Over time, the spacing between the teeth may change, the height of the teeth may change, the wheel may curve, and/or other issues may arise leading to erroneous determinations of engine crank angle. For example, a given wheel may ideally produce a voltage peak every 10 crank angle degrees (expect for the one missing tooth). Thus, when the signal from the crankshaft position sensor is at the tenth voltage peak from the missing tooth reference, the engine should be at 100 degrees crank angle from the reference position (e.g., 0 degrees crank angle). However, if the profile of the wheel changes, it may cause the tenth voltage peak to occur at 95 degrees crank angle instead. Because proper identification of a knocking cylinder during fueled engine conditions relies on the output from the crankshaft position sensor, the misidentification of the persistently-knocking cylinder (e.g., where the first cylinder was identified as the persistently-knocking cylinder during fueled engine operation but a different cylinder was identified as an induced-knocking cylinder during the knock diagnostic routine) may be an indication that the crankshaft position sensor profile has changed. By relearning the profile, these changes may be accounted for by the controller, e.g., by applying a correction factor to the crankshaft position sensor output.

To relearn the crankshaft position sensor profile, the crankshaft position sensor may be sampled during a no load condition where the crankshaft is rotating. Such a condition may include during an engine soak, where the engine and vehicle are shut off. The controller may wake up during engine soak and execute the profile relearning. In other examples, the profile may be relearned during DFSO. However, certain vehicle operating conditions may affect the profile learning, such as application of power steering, braking, etc. Thus, the learning of the profile may be most accurately performed with the vehicle shut off and no operator present.

Relearning the crankshaft position sensor profile may include confirming the vehicle is parked on flat ground, as indicated at 438. The vehicle may have a gyroscope or other position sensor that measures position in six degrees of freedom, and output from this position sensor may confirm that the vehicle is on level ground. If the vehicle is not on level ground (e.g., parked at an incline), the relearning may be delayed until a future engine/vehicle off period. The relearning may also include activating the e-brake, as indicated at 440, cranking the engine (e.g., with a starter motor), as indicated at 442, and shifting to neutral gear, as indicated at 444. In this way, the crankshaft may rotate at a constant speed.

At 446, the profile is learned by sampling the output from the crankshaft position sensor while the engine is being cranked, averaging the CKP sensor measured half-period times, and normalizing them to 1. These "correction factors" are stored in memory of the controller. For example, if the engine is rotating at 400 RPM during cranking, the wheel will rotate once every 150 milliseconds, leading to a voltage pulse ideally occurring approximately once every four milliseconds. The half-period times would be equal (assuming equally spaced teeth) and would be two milliseconds in the example presented above. If the half period times were averaged and then normalized to one, the result would be a correction factor of 1 for each half period. However, due to irregularities in the wheel, the teeth are unlikely to be spaced equally. Thus, instead of equal half period times, an actual wheel may result in half period times of (for ten example half periods) 2, 2.05, 1.95, 2.5, 1.9, 1.8, 2.1, 2, 1.95, and 2.1. This would result in an average half period time of 2.035 and a set of correction factors of 0.98, 1.01, 0.96, 1.2, 0.93, 0.88, 1.03, 0.98, 0.96, and 1.03. Then, when the sampled signal is processed during vehicle operation, each half period time may be adjusted by the appropriate correction factor to generate a corrected signal from which engine position and speed may be determined. However, other ways for learning and correcting for the profile of the wheel are within the scope of this disclosure.

In this way, a knock diagnostic may be carried during DFSO or other unfueled engine operation where the engine continues to rotate. The knock diagnostic may include attempting to induce knock in each cylinder one-by-one by creating conditions in the cylinders that may cause knocking in a cylinder predisposed to knocking (e.g., a cylinder with a large build-up of soot), and then activating each cylinder one by one and monitoring to see if each cylinder knocks. Because knocking typically only occurs during heavy load conditions, such as highway travel, towing, etc., and because a one-by-one monitoring of cylinder knock (while other cylinders are silent) is not possible during these conditions where cylinder knock is most likely occur, the cylinders may be pushed to knock during DFSO by heating the cylinders via gas compression. Cylinders prone to knocking can then be identified via the knock diagnostic. If a cylinder is identified as a persistently-knocking cylinder during fueled engine operation (e.g., where spark retard does not mitigate the knock), the knock diagnostic presents an opportunity to validate that the persistently-knocking cylinder is knocking due to cylinder conditions such as soot build-up. However, if the knock diagnostic does not confirm that the same cylinder identified as being a persistently-knocking cylinder during a prior fueled engine operation also knocks during the unfueled engine operation when the cylinders are induced to knock, the presumption may be that the crankshaft position sensor data was inaccurate, leading to inaccurate identification of the knocking cylinder during normal engine operation, in particular if the cylinder induced to knock during the knock diagnostic routine is an adjacent cylinder to the identified persistently-knocking cylinder in an engine firing order. Thus, the crankshaft position sensor wheel profile may be relearned. If the erroneous knock identification still occurs, even after updating the crankshaft position sensor wheel profile, the knock sensor may be degraded.

Figure 5:
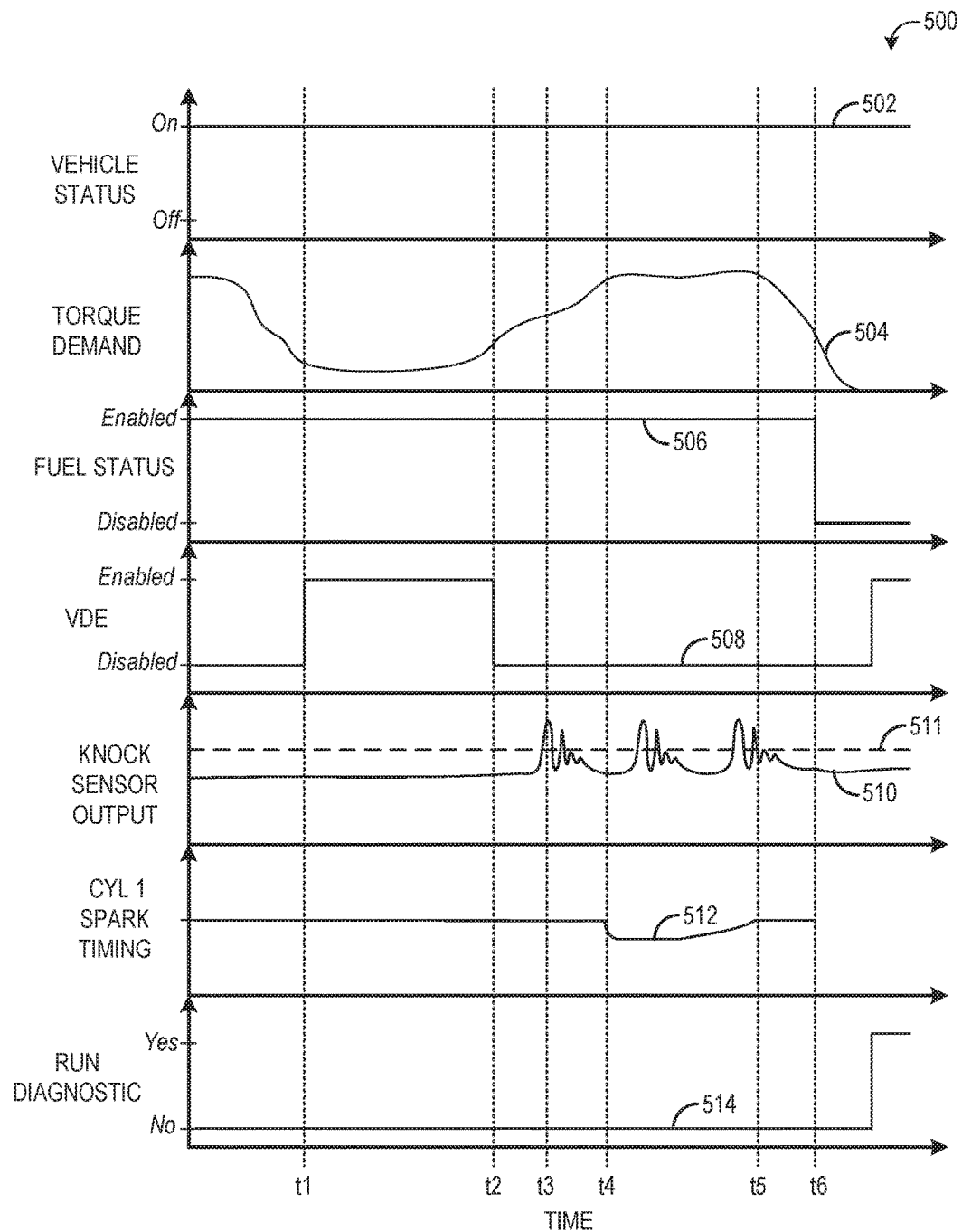
FIGS. 5 and 6 are timelines of operating parameters of interest that may be observed during execution of the methods illustrated in FIGS. 3-4B.

FIG. 5 is a timeline 500 of example operating parameters that may be observed during the execution of method 300, for example. Timeline 500 includes a plot illustrating vehicle status (shown by curve 502), a plot illustrating torque demand (shown by curve 504), a plot illustrating fuel status (shown by curve 506), a plot illustrating VDE mode (shown by curve 508), a plot illustrating knock sensor output (shown by curve 510), a plot illustrating spark timing for a first cylinder of the engine (shown by curve 512), and a plot illustrating knock diagnostic status (shown by curve 514). All plots are a function of time and are time-aligned. The y-axis for each plot represents values for each operation parameter, which may be binary (e.g., yes/no, enabled/disabled) or continuous, where continuous plots increase in value along the y-axis.

Prior to time t1, the vehicle is on and the engine is receiving fuel. Due to a relatively high torque demand, the VDE is disabled and the engine is operating with all cylinders undergoing combustion according to the firing order of the engine. The knock sensor is not detecting knock, as the output from the knock sensor is below a knock threshold (shown by line 511). The spark timing for a first cylinder is at MBT or other nominal timing. As time approaches t1, torque demand is dropping and at t1 drops to a level at which operation of all cylinders is not required to produce operator-requested torque. Thus, at t1, VDE is enabled. During operation in the VDE mode, some cylinders (e.g., at least one) are disabled while other cylinders still undergo combustion. To disable a cylinder, the cylinder valves may be held closed and fuel and spark to that cylinder is disabled. Because some cylinders still receive fuel, fueling is still enabled and the engine is still operating fueled. From time t1 to t2, torque demand remains low enough to maintain operation in the VDE mode. At time t2, torque demand increases to a point where all cylinders are required or requested in order to deliver the requested torque. Thus, at t2, VDE mode is disabled and all cylinders are active and undergoing combustion.

At time t3, knock sensor output exceeds the knock threshold, indicating a knock event. The controller may identify, based on output from the crankshaft position sensor, that the first cylinder is undergoing knock. Thus, as shown by curve 512, at time t4 spark timing is retarded from MBT for the first cylinder. However, between t4 and t5, the knock sensor output continues to indicate knocking is occurring. Thus, it is determined that the first cylinder is a persistently-knocking cylinder.

At time t6, torque demand is dropping as the vehicle travels down a hill. The vehicle enters DFSO mode, and fueling to all cylinders is disabled. During the DFSO operation, and in response to the identification of the persistently-knocking cylinder, the knock diagnostic is executed, as shown by curve 514. Operating parameters during the knock diagnostic are illustrated in FIG. 6 and described in more detail below.

Figure 6:
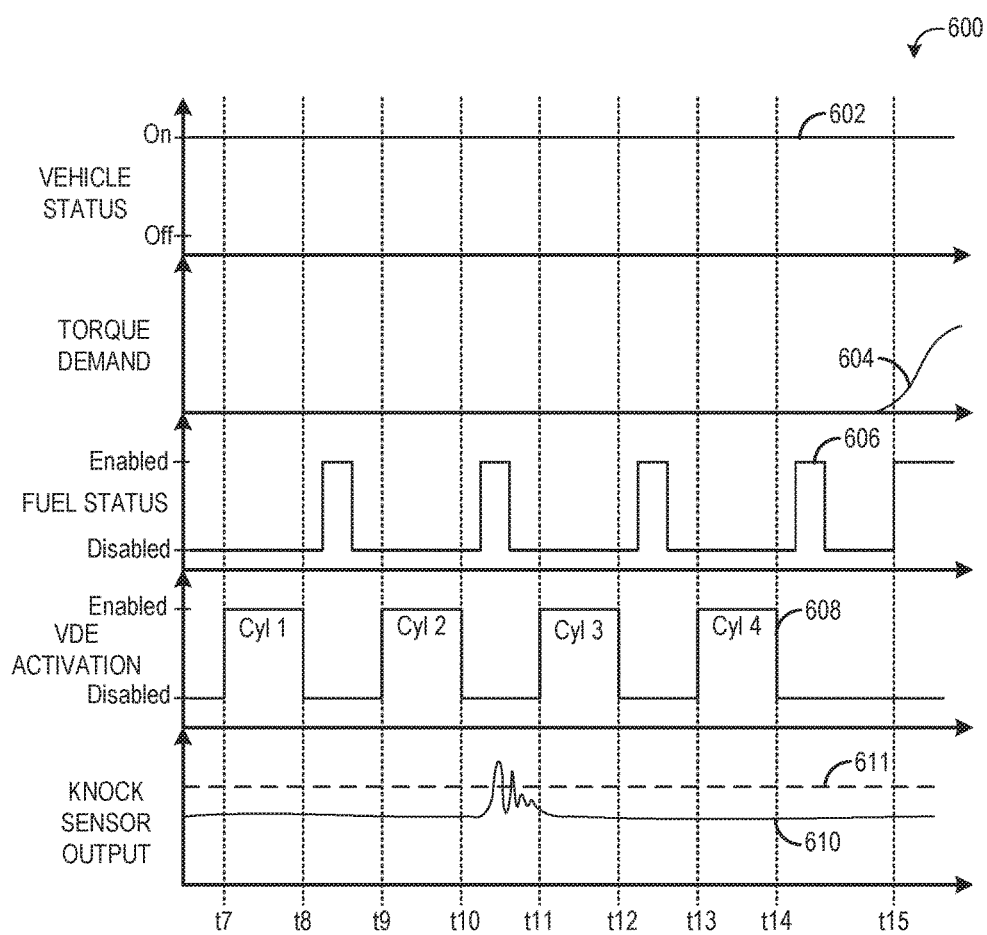

FIG. 6 is a timeline 600 illustrating certain operating parameters during execution of a knock diagnostic routine. Timeline 600 is shown as a continuation of timeline 500 of FIG. 5, for example time t7 of timeline 600 follows time t6 of timeline 500. Timeline 600 includes a plot illustrating vehicle status (shown by curve 602), a plot illustrating torque demand (shown by curve 604), a plot illustrating fuel status (shown by curve 606), a plot illustrating VDE mode (shown by curve 608), and a plot illustrating knock sensor output (shown by curve 610). All plots are a function of time and are time-aligned. The y-axis for each plot represents values for each operation parameter, which may be binary (e.g., yes/no, enabled/disabled) or continuous, where continuous plots increase in value along the y-axis.

At time t7, the knock diagnostic routine is initiated. The knock diagnostic routine is being executed during a DFSO operation, which includes the vehicle being on (as shown by curve 602) and no torque being requested from the engine (which is shown by curve 604). Fueling to the engine is disabled, as shown by curve 606. Prior to initiation of the knock diagnostic routine, the VDE mode is in the disabled mode, and the cylinder valves of all cylinders are actuated. Knock sensor output is below the knock threshold (shown by line 611), as no cylinders are knocking.

The knock diagnostic routine begins at t7 by enabling the VDE mode for the first cylinder of the engine. With the VDE mechanisms enabled, the intake and exhaust valves of the first cylinder are held closed. The piston of the first cylinder continues to move in the cylinder, causing trapped gas in the first cylinder to heat up. At time t8, the VDE mechanisms are disabled, causing the intake and exhaust valves of the first cylinder to actuate according to the phases of the cylinder cycle (e.g., the intake valve opens during the intake stroke and the exhaust valve opens during the exhaust stroke). Also after t8, fueling (and spark) to the first cylinder only is enabled. As a result, combustion occurs in only the first cylinder. However, as appreciated from curve 610, the knock sensor output remains below the knock threshold while the first cylinder undergoes combustion. Thus, the first cylinder is not indicated to be an induced-knocking cylinder.

At time t9, the VDE mechanisms are enabled for the second cylinder of the engine, causing the intake and exhaust valves of the second cylinder to be held closed. The piston of the second cylinder continues to move in the cylinder, causing trapped gas in the second cylinder to heat up. At time t10, the VDE mechanisms are disabled, causing the intake and exhaust valves of the second cylinder to actuate according to the phases of the cylinder cycle (e.g., the intake valve opens during the intake stroke and the exhaust valve opens during the exhaust stroke). Also after t10, fueling (and spark) to the second cylinder only is enabled. As a result, combustion occurs in only the second cylinder. As appreciated from curve 610, the knock sensor output exceeds the knock threshold while the second cylinder undergoes combustion. Thus, the second cylinder is indicated to be an induced-knocking cylinder.

At time t11, the VDE mechanisms are enabled for the third cylinder of the engine, causing the intake and exhaust valves of the third cylinder to be held closed. The piston of the third cylinder continues to move in the cylinder, causing trapped gas in the third cylinder to heat up. At time t12, the VDE mechanisms are disabled, causing the intake and exhaust valves of the third cylinder to actuate according to the phases of the cylinder cycle (e.g., the intake valve opens during the intake stroke and the exhaust valve opens during the exhaust stroke). Also after t12, fueling (and spark) to the third cylinder only is enabled. As a result, combustion occurs in only the third cylinder. As appreciated from curve 610, the knock sensor output remains below the knock threshold while the third cylinder undergoes combustion. Thus, the third cylinder is not indicated to be an induced-knocking cylinder.

At time t13, the VDE mechanisms are enabled for the fourth cylinder of the engine, causing the intake and exhaust valves of the fourth cylinder to be held closed. The piston of the fourth cylinder continues to move in the cylinder, causing trapped gas in the fourth cylinder to heat up. At time t14, the VDE mechanisms are disabled, causing the intake and exhaust valves of the fourth cylinder to actuate according to the phases of the cylinder cycle (e.g., the intake valve opens during the intake stroke and the exhaust valve opens during the exhaust stroke). Also after t14, fueling (and spark) to the fourth cylinder only is enabled. As a result, combustion occurs in only the fourth cylinder. As appreciated from curve 610, the knock sensor output remains below the knock threshold while the fourth cylinder undergoes combustion. Thus, the fourth cylinder is not indicated to be an induced-knocking cylinder.

At time t15, engine torque demand is increasing and thus DFSO is disabled. As a result, at t15, fueling is enabled to all the cylinders (and VDE remains disabled). The knock diagnostic routine is thus terminated. In examples where the engine only includes four cylinders, the knock diagnostic routine is complete. In examples where the engine includes more than four cylinders (and thus the diagnostic routine is not complete), the remaining cylinders may be checked for induced knocking during a subsequent DFSO operation.

By comparing the persistently-knocking cylinder identified during fueled engine operation (shown in timeline 500) to the induced-knocking cylinder identified during non-fueled engine operation (shown in timeline 600), the controller may differentiate between a cylinder that is persistently knocking due to cylinder conditions such as soot build up and a crankshaft position sensor that is outputting incorrect engine position data. For example, in timeline 500, the first cylinder of the engine is identified as a persistently-knocking cylinder, while in timeline 600, the second cylinder of the engine is identified as an induced-knocking cylinder. The persistently-knocking cylinder and the induced-knocking cylinder are not the same cylinder (e.g., cylinder one versus cylinder two), and thus the crankshaft position sensor is determined to be degraded (or to have undergone a change in performance). The crankshaft position sensor wheel profile is then relearned, such as during a subsequent engine (and vehicle) off period.

A technical effect of performing a one-by-one analysis of cylinder knocking while all other cylinders are disabled is the ability to distinguish between persistent cylinder knocking due to soot build up and persistent cylinder knocking due to erroneous identification of the knocking cylinder stemming from inaccurate crankshaft position data. Another technical effect of performing the one-by-one analysis of cylinder knocking is increased fuel economy by mitigating knock in only the knocking cylinder and not in other non-knocking cylinders, reduced component degradation, and detection of crankshaft position sensor degradation.

The systems and methods described herein provide for a method, including, during fuel-cut operation, heating an engine cylinder, and upon fuel reactivation, re-learning a crankshaft sensor profile responsive to lack of knock in the heated cylinder. In a first example of the method, heating the engine cylinder during fuel-cut operation comprises holding cylinder valves of the engine cylinder closed while fuel injection and spark to the engine cylinder are disabled, thereby heating the engine cylinder via compression of trapped cylinder gas by a piston of the engine cylinder. In a second example of the method, which optionally includes the first example, the method further includes, upon heating the engine cylinder, fuel reactivating the heated cylinder by actuating the cylinder valves of the heated cylinder, injecting fuel to the heated cylinder, and applying spark to the heated cylinder; and indicating a lack of knock in the heated cylinder responsive to output from a knock sensor being below a knock threshold upon the fuel reactivation. In a third example of the method, which optionally includes one or both of the first and second examples, the crankshaft sensor profile is a profile of a crankshaft position sensor operable to measure engine position, and the method further includes identifying that the engine cylinder is knocking during a previous fueled engine operation based on output from the knock sensor and based on output from the crankshaft position sensor. In a fourth example of the method, which optionally includes one or more or each of the first through third examples, the method further includes notifying an operator and/or setting a diagnostic code indicating that the heated cylinder is a persistently-knocking cylinder responsive to detecting knock in the heated cylinder upon fuel reactivation. In a fifth example of the method, which optionally includes one or more or each of the first through fourth examples, the engine cylinder is a first cylinder, and the method further includes, responsive to the lack of knock in the heated first cylinder, heating a second cylinder and confirming if the second cylinder knocks upon fuel reactivation to the second cylinder. In a sixth example of the method, which optionally includes one or more or each of the first through fifth examples, the engine cylinder is an engine cylinder of an engine of a vehicle, and the fuel-cut operation comprises operation of the vehicle with operator-requested torque below a threshold where fuel supply to the engine is disabled and the engine still rotates.

A method is provided. The method includes, during fueled engine operation, identifying a persistently-knocking cylinder of an engine; during unfueled engine operation, heating each cylinder of the engine; reactivating each cylinder one-by-one to identify if any cylinders of the engine are induced to knock; and indicating a change in performance of a crankshaft position sensor responsive to determining that the persistently-knocking cylinder is not induced to knock upon reactivation and an adjacent cylinder in an engine firing order is induced to knock upon reactivation. In a first example of the method, the method further includes, responsive to determining that the persistently-knocking cylinder is induced to knock upon reactivation, indicating that the persistently-knocking cylinder is degraded, and in response, notifying an operator and/or adjusting one or more engine operating parameters. In a second example of the method, which optionally includes the first example, identifying the persistently-knocking cylinder during fueled engine operation comprises initiating combustion in one or more cylinders of the engine according to the engine firing order and determining, based on output from a knock sensor being greater than a knock threshold, that a cylinder of the one or more cylinders is knocking. In a third example of the method, which optionally includes one or both of the first and second examples, the method further includes identifying which cylinder of the one or more cylinders is knocking based on output from the crankshaft position sensor; retarding spark timing of the identified cylinder; and if output from the knock sensor is still greater than the knock threshold, determining that the identified cylinder is the persistently-knocking cylinder. In a fourth example of the method, which optionally includes one or more or each of the first through third examples, heating each cylinder of the engine and reactivating each cylinder one-by-one to identify if any cylinders of the engine are induced to knock comprises: disabling fuel injection and spark to all cylinders of the engine; holding cylinder valves of each cylinder closed while fuel injection and spark to each cylinder are disabled and heating each cylinder via compression of trapped cylinder gas by a respective piston; and reactivating each cylinder one-by-one by actuating cylinder valves for a reactivated cylinder, injecting fuel to the reactivated cylinder, activating spark in the reactivated cylinder, and repeating the actuating, injecting, and activating successively for each remaining cylinder. In a fifth example of the method, which optionally includes one or more or each of the first through fourth examples, the method further includes, responsive to indicating the change in performance of the crankshaft position sensor, relearning crankshaft position sensor tooth location. In a sixth example of the method, which optionally includes one or more or each of the first through fifth examples, relearning crankshaft position sensor tooth location comprises, during an engine-off condition when a vehicle in which the engine is installed is parked on level ground: cranking the engine at a constant speed while a transmission of the engine is in neutral; sampling output from the crankshaft position sensor; calculating a distance between each tooth of the crankshaft position sensor based on the output from the crankshaft position sensor; and updating a table stored in memory of a controller of the vehicle with the calculated distance between each tooth. In an example, the distance between each tooth may be based on half-period or period times of the signal output by the crankshaft position sensor.

A system is provided. The system includes an engine; a crankshaft position sensor configured to measure a position and speed of the engine; a knock sensor configured to measure vibrations of the engine; a variable displacement engine (VDE) mechanism configured to selectively disable one or more cylinders of the engine; and a controller storing instructions in non-transitory memory executable to: during fuel-cut operation, heat a first cylinder of the engine by adjusting the VDE mechanism to hold cylinder valves of the first cylinder closed while a piston of the first cylinder compresses trapped gas in the first cylinder; and upon fuel reactivation, re-learning a profile of the crankshaft position sensor responsive to lack of knock in the heated first cylinder, the lack of knock detected based on output from the knock sensor. In a first example of the system, the fuel reactivation includes adjusting the VDE mechanism to actuate the cylinder valves of the heated first cylinder, injecting fuel to the heated first cylinder, and applying spark to the heated first cylinder. In a second example of the system, which optionally includes the first example, the instructions are executable to notify an operator and/or set a diagnostic code indicating that the heated first cylinder is a persistently-knocking cylinder responsive to detecting knock in the heated first cylinder upon fuel reactivation. In a third example of the system, which optionally includes one or both of the first and second examples, the instructions are executable to identify that the first cylinder is a persistently knocking cylinder during a prior fueled engine operation by: determining, based on output from the knock sensor, that a cylinder of the engine is knocking; identifying that the first cylinder of the engine is knocking based on output from the crankshaft position sensor; retarding spark timing of the first cylinder; and determining that the first cylinder is a persistently-knocking cylinder upon output from the knock indicating that the first cylinder is still knocking. In a fourth example of the system, which optionally includes one or more or each of the first through third examples, the instructions are executable to re-learn the profile of the crankshaft position sensor during an engine-off condition when a vehicle in which the engine is installed is parked on level ground. In a fifth example of the system, which optionally includes one or more or each of the first through fourth examples, to re-learn the profile, the instructions are executable to: crank the engine at a constant speed while a transmission of the engine is in neutral; sample output from the crankshaft position sensor; calculate and normalize half-period times for each tooth of the crankshaft position sensor based on the output from the crankshaft position sensor; and update a table stored in memory of the controller with the normalized half-period times.

In another representation, a method includes, responsive to identifying that a first cylinder of an engine is a persistently-knocking cylinder, during unfueled engine operation, holding an exhaust valve and an intake valve of the first cylinder closed to heat the first cylinder; upon reactivation of the first cylinder and responsive to output from a knock sensor being equal to or above a threshold, confirming that the first cylinder is undergoing knock and adjusting one or more engine operating parameters; and upon reactivation of the first cylinder and responsive to output from the knock sensor being below the threshold, indicating that the first cylinder is not undergoing knock and differentiating between a degraded crankshaft position sensor and a degraded knock sensor by successively deactivating and then reactivating remaining cylinders. In an example, differentiating between a degraded crankshaft position sensor and a degraded knock sensor by successively deactivating and then reactivating remaining cylinders includes indicating that the crankshaft position sensor is degraded responsive to output from the knock sensor being equal to or above the knock threshold upon deactivating and then reactivating a second cylinder adjacent to the first cylinder in an engine firing order. In an example, differentiating between a degraded crankshaft position sensor and a degraded knock sensor by successively deactivating and then reactivating remaining cylinders may include indicating that the knock sensor is degraded responsive to the output from the knock sensor being equal to or greater than the knock threshold following each cylinder reactivation.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system, comprising:
an engine;
a crankshaft position sensor configured to measure a position and speed of the engine;
a knock sensor configured to measure vibrations of the engine;
a variable displacement engine (VDE) mechanism configured to selectively disable one or more cylinders of the engine; and
a controller storing instructions in non-transitory memory executable to:
during fuel-cut operation, heat a first cylinder of the engine by adjusting the VDE mechanism to hold cylinder valves of the first cylinder closed while a piston of the first cylinder compresses trapped gas in the first cylinder; and
upon fuel reactivation, re-learning a profile of the crankshaft position sensor responsive to lack of knock in the heated first cylinder, the lack of knock detected based on output from the knock sensor.

2. The system of claim 1, wherein the fuel reactivation includes adjusting the VDE mechanism to actuate the cylinder valves of the heated first cylinder, injecting fuel to the heated first cylinder, and applying spark to the heated first cylinder.

3. The system of claim 1, wherein the instructions are executable to notify an operator and/or set a diagnostic code indicating that the heated first cylinder is a persistently-knocking cylinder responsive to detecting knock in the heated first cylinder upon fuel reactivation.

4. The system of claim 1, wherein the instructions are executable to identify that the first cylinder is a persistently knocking cylinder during a prior fueled engine operation by:
determining, based on output from the knock sensor, that a cylinder of the engine is knocking;
identifying that the first cylinder of the engine is knocking based on output from the crankshaft position sensor;
retarding spark timing of the first cylinder; and
determining that the first cylinder is a persistently-knocking cylinder upon output from the knock indicating that the first cylinder is still knocking.

5. The system of claim 1, wherein the instructions are executable to re-learn the profile of the crankshaft position sensor during an engine-off condition when a vehicle in which the engine is installed is parked on level ground.

6. The system of claim 5, wherein to re-learn the profile, the instructions are executable to:
crank the engine at a constant speed while a transmission of the engine is in neutral;
sample output from the crankshaft position sensor;
calculate and normalize half-period times for each tooth of the crankshaft position sensor based on the output from the crankshaft position sensor; and
update a table stored in memory of the controller with the normalized half-period times.

7. A method, comprising:
during fuel-cut operation, heating an engine cylinder; and
upon fuel reactivation, re-learning a crankshaft sensor profile responsive to lack of knock in the heated cylinder.

8. The method of claim 7, wherein heating the engine cylinder during fuel-cut operation comprises holding cylinder valves of the engine cylinder closed while fuel injection and spark to the engine cylinder are disabled, thereby heating the engine cylinder via compression of trapped cylinder gas by a piston of the engine cylinder.

9. The method of claim 8, further comprising upon heating the engine cylinder, fuel reactivating the heated cylinder by actuating the cylinder valves of the heated cylinder, injecting fuel to the heated cylinder, and applying spark to the heated cylinder; and indicating a lack of knock in the heated cylinder responsive to output from a knock sensor being below a knock threshold upon the fuel reactivation.

10. The method of claim 9, wherein the crankshaft sensor profile is a profile of a crankshaft position sensor operable to measure engine position, and further comprising identifying that the engine cylinder is knocking during a previous fueled engine operation based on output from the knock sensor and based on output from the crankshaft position sensor.

11. The method of claim 9, further comprising notifying an operator and/or setting a diagnostic code indicating that the heated cylinder is a persistently-knocking cylinder responsive to detecting knock in the heated cylinder upon fuel reactivation.

12. The method of claim 7, wherein the engine cylinder is a first cylinder, and further comprising responsive to the lack of knock in the heated first cylinder, heating a second cylinder and confirming if the second cylinder knocks upon fuel reactivation to the second cylinder.

13. The method of claim 7, wherein the engine cylinder is an engine cylinder of an engine of a vehicle, and wherein the fuel-cut operation comprises operation of the vehicle with operator-requested torque below a threshold where fuel supply to the engine is disabled and the engine still rotates.

14. A method, comprising:
during fueled engine operation, identifying a persistently-knocking cylinder of an engine;
during unfueled engine operation, heating each cylinder of the engine;
reactivating each cylinder one-by-one to identify if any cylinders of the engine are induced to knock; and
indicating a change in performance of a crankshaft position sensor responsive to determining that the persistently-knocking cylinder is not induced to knock upon reactivation and an adjacent cylinder in an engine firing order is induced to knock upon reactivation.

15. The method of claim 14, further comprising responsive to determining that the persistently-knocking cylinder is induced to knock upon reactivation, indicating that the persistently-knocking cylinder is degraded, and in response, notifying an operator and/or adjusting one or more engine operating parameters.

16. The method of claim 14, wherein identifying the persistently-knocking cylinder during fueled engine operation comprises initiating combustion in one or more cylinders of the engine according to the engine firing order and determining, based on output from a knock sensor being greater than a knock threshold, that a cylinder of the one or more cylinders is knocking.

17. The method of claim 16, further comprising:
identifying which cylinder of the one or more cylinders is knocking based on output from the crankshaft position sensor;
retarding spark timing of the identified cylinder; and
if output from the knock sensor is still greater than the knock threshold, determining that the identified cylinder is the persistently-knocking cylinder.

18. The method of claim 14, wherein heating each cylinder of the engine and reactivating each cylinder one-by-one to identify if any cylinders of the engine are induced to knock comprises:
disabling fuel injection and spark to all cylinders of the engine;
holding cylinder valves of each cylinder closed while fuel injection and spark to each cylinder are disabled and heating each cylinder via compression of trapped cylinder gas by a respective piston; and
reactivating each cylinder one-by-one by actuating cylinder valves for a reactivated cylinder, injecting fuel to the reactivated cylinder, activating spark in the reactivated cylinder, and repeating the actuating, injecting, and activating successively for each remaining cylinder.

19. The method of claim 14, further comprising responsive to indicating the change in performance of the crankshaft position sensor, relearning crankshaft position sensor tooth location.

20. The method of claim 19, wherein relearning crankshaft position sensor tooth location comprises, during an engine-off condition when a vehicle in which the engine is installed is parked on level ground:
cranking the engine at a constant speed while a transmission of the engine is in neutral;
sampling output from the crankshaft position sensor;
calculating a distance between each tooth of the crankshaft position sensor based on the output from the crankshaft position sensor; and
updating a table stored in memory of a controller of the vehicle with the calculated distance between each tooth.

* * * * *